K. ALQUIST.
GEAR WHEEL.
APPLICATION FILED FEB. 26, 1918.

1,326,706.

Patented Dec. 30, 1919.

Inventor
Karl Alquist,
by Alexander Davis
His Attorney.

UNITED STATES PATENT OFFICE.

KARL ALQUIST, OF SCHENECTADY, NEW YORK.

GEAR-WHEEL.

1,326,706.  Specification of Letters Patent.  Patented Dec. 30, 1919.

Application filed February 26, 1918. Serial No. 219,289.

*To all whom it may concern:*

Be it known that I, KARL ALQUIST, a subject of the King of Sweden, residing at Schenectady, county of Schenectady, State of New York, have invented certain new and useful Improvements in Gear-Wheels, of which the following is a specification.

The present invention relates to gear wheels and particularly to gear wheels of the flexible type invented by me which comprise a plurality of plates or disks fixed rigidly together at their central portions on a common support or shaft and slightly spaced apart at their peripheries to allow of slight axial yielding under tooth pressure. Such a gear wheel is well adapted for use in a gear train comprising a driving pinion, a driven gear wheel and two intermediate gear wheels or two sets of intermediate gear wheels through which power is transmitted from the pinion to the driven gear wheel in parallel.

It has been found in ordinary commercial manufacture that there are always slight errors in the tooth structure of gear wheels due to the teeth not being cut absolutely accurately and also that slight errors are always present in any gearing occasioned by the fact that it is, in practice, impossible to aline the gearing shaft bearings absolutely accurately, and maintain them so. These errors, of course, in any case are never great, but they may be of such magnitude in some instances, as to require a considerable amount of flexibility in the gearing, to take care of them.

The object of my invention is to provide an improved gear wheel of the flexible type which, while keeping the stresses in the material below a safe limit, will at the same time, provide a gear wheel having a great deal of flexibility.

For a consideration of what I believe to be novel and my invention, attention is directed to the accompanying specification, and the claims appended thereto.

Figure 1:
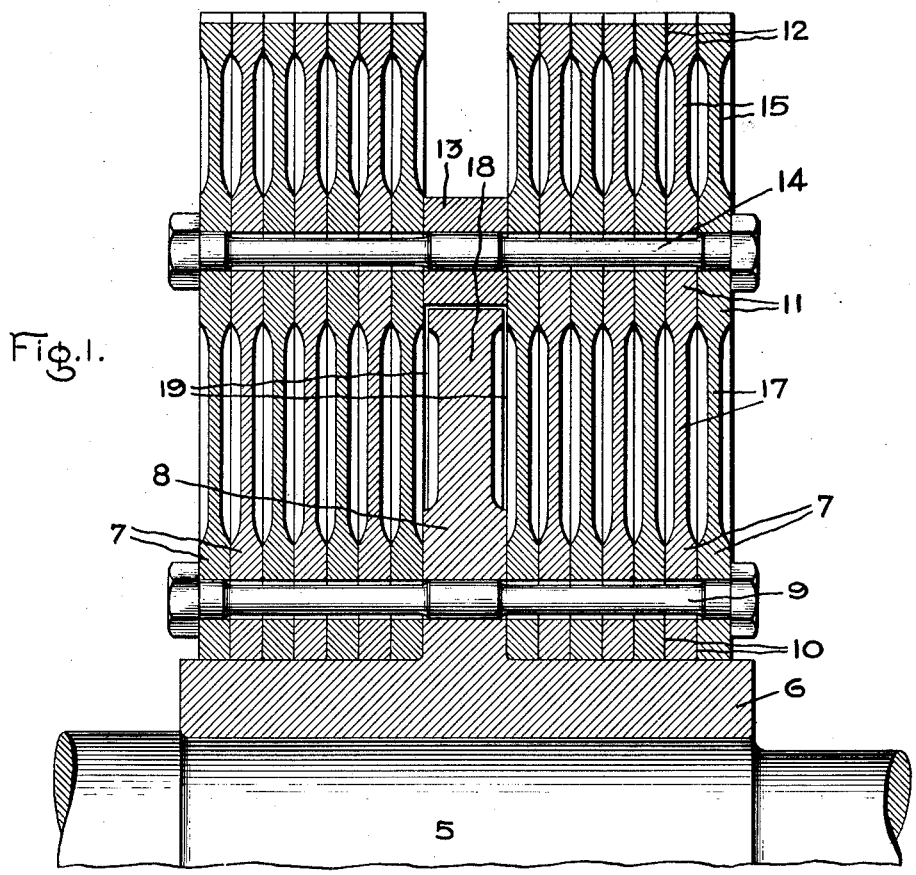
Figure 2:
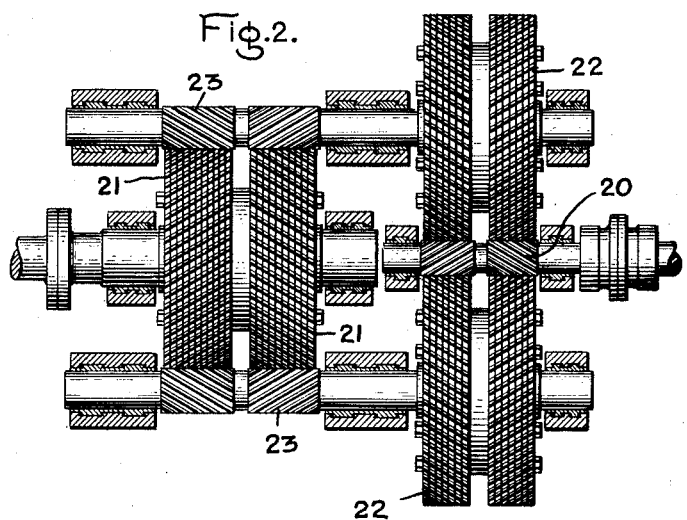

In the drawing, Figure 1 is a radial sectional view of a portion of a gear wheel embodying my invention, and Fig. 2 is a plan view of a gearing, in which my invention may be utilized.

Referring to the drawing, Fig. 1, 5 indicates a shaft upon which is mounted a flexible gear wheel comprising a hub or supporting member 6 upon which is mounted a plurality of plates or disks 7. The gear wheel is of the herringbone or double helical type and is accordingly formed in two slightly spaced halves as is customary, one half having right-hand helical teeth and the other left-hand helical teeth. The supporting member has an annular projecting ring 8 at its central portion, against each side of which a plurality of plates or disks 7 are clamped by suitable bolts 9. The plates or disks 7 are in engagement with each other adjacent the hub or supporting member 6 as indicated at 10, and also on an intermediate circle where the portions 11 are in contact, and they are slightly spaced apart at their peripheries, as indicated at 12, so that the individual plates or disks may yield slightly in an axial direction under tooth pressure. At the intermediate portions 11 where the disks 7 are in contact with each other, an intermediate ring 13 is provided between the two halves of the gear wheel which is of the same width as the central ring 8 and the plates or disks 7 are clamped to each other and to the ring 13 by suitable bolts 14, thus holding them rigidly together. The plates or disks 7 are thinned down between the intermediate portions 11 and the peripheries, as indicated at 15, to give flexibility to them so that they may give slightly in an axial direction under tooth pressure to equalize the load. Such axial yielding of the individual disks takes place in the part of the disk between portions 11 and the periphery. The plates or disks 7 are also thinned down between the intermediate portions 11 and their centers, this being also for the purpose of giving flexibility. This structure means in substance that the central portion of the gear wheel, that is, the portion adjacent the hub, and the intermediate portion 11 are connected together by spaced webs 17 which form an axially yieldable coupling or connection whereby the disks as a whole may yield axially relative to the hub structure.

I have found in connection with gearing structures that there are certain inaccuracies which are appurtenant to the individual plates or disks 7, for example, errors in tooth structure, while there are other inaccuracies which are appurtenant to the gear wheel as a whole, for example, errors in bearing alinements. With my improved gear wheel structure inaccuracies of the former character may be taken care of by an axial flexing or yielding of the plates or disks 7 between the intermediate portion 11 thereof, and the periphery, while those of the latter character may be taken care of by an axial flexing or yielding of the webs 17. By this means I am able to give the desired degree of flexibility to the gear wheel without so thinning the radially outer portions of the disks 7 that the permissible stresses therein will be exceeded. As will be clear, the degree of flexibility of the radially outer portions of the plates or disks 7 and the stresses therein may be modified by varying the radial distance between the intermediate contacting portion 11 and the periphery of the gear wheel.

The webs 17 since they are in substance rigidly connected together at their centers and peripheries are subjected individually to but slight bending stresses, if any, due to the tooth pressure, since axial pressure on the two halves of the gear wheel are balanced. The webs 17 may, therefore, be made as thin as found desirable, it being only necessary that they be strong enough individually to transmit the driving torque. On the other hand, by connecting the webs 17 they form collectively what may be termed an axially yieldable coupling between the outer portion of the gear wheel and the hub 6, being somewhat in the nature of a diaphragm coupling. It will be evident that the hub 6 may move axially relative to the radially outer portion of the gear wheel or vice versa, the webs 17 flexing as a whole. The webs 17 work in parallel and being spaced apart axially as shown, there will be little tendency for the radially outer or rim portion of the gear wheel to tilt.

It may be desirable to provide a means to limit the axial movement of the hub 6 and the radially outer portion of the gear wheel relative to each other due to the flexing of webs 17, and to this end the ring 8 may be provided with an extension 18 which is of slightly less width than the ring 8 and which terminates intermediate the portion 11 adjacent ring 13.

This provides a clearance on each side of extension 18, as indicated at 19 which may be of an amount to permit of the desired maximum deflection. Such a stop or limiting means is of service in handling the gear wheel, to prevent undue deflection which might result in springing the plates. It is also of service at other times. While the gear wheel is being cut or adjusted radially extending dowel pins may be used temporarily between the extension 18 and the adjacent surfaces of the central portion 11 of the gear wheel to center such extension relative to the ring 13.

Fig. 2 shows a gearing in which a gear wheel as described above is well adapted for use. In this figure 20 indicates a high speed pinion which drives a gear wheel 21 through two sets of intermediate gear wheels, each comprising a high speed gear wheel 22 and a low speed pinion 23. The shafts for all these gear wheels are shown as arranged in the same plane. The high speed gear wheels 22 and the low speed gear wheel 21 are shown as being of the flexible type invented by me as referred to at the beginning of this specification, and all of them or any one of them may be of the specific structure as disclosed in Fig. 1. Preferably, however, only the high speed gear wheels 22 will be constructed in such manner, for equalizing strains within the gearing system. However, the low speed wheel 21 may be made according to this invention more with the view of acting as a flexible coupling or buffer to deal with axial movements or blows, from the driven apparatus and to guard against strains on the gears from such an outside source.

A gearing as shown in Fig. 2 is well adapted for ship propulsion, the shaft of the low speed gear wheel being connected to the propeller shaft, while the pinion is driven by a suitable prime mover, as an elastic fluid turbine. With such an arrangement the gear wheel 21 being of the structure shown in Fig. 1, the webs 17 will flex when the gearing is subjected to axial shocks from the propeller shaft, thus preventing such shocks being transmitted to low speed pinions 23 and thence to the high speed end of the gearing.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. A gear wheel comprising a plurality of disks which are rigidly clamped together on a circumference spaced radially from their peripheries and are slightly spaced apart at their peripheries to permit of slight axial yielding under tooth pressure, a supporting member, and axially yielding means connecting said disks to said supporting member.

2. A gear wheel comprising a plurality of disks which are rigidly clamped together on a circumference spaced radially from their peripheries and are slightly spaced apart at their peripheries to permit of slight axial yielding under tooth pressure, a supporting member, and axially yielding means formed integral with said disks for connecting them to said supporting member.

3. A gear wheel comprising a plurality of disks rigidly clamped together at their central portions and also on a circle intermediate between their central portions and their peripheries and slightly spaced apart at their peripheries to permit of axial yielding under tooth pressure, the material of the disks between their central portions and said intermediate circle being thinned to give such portions of the disks axial flexibility.

4. A gear wheel comprising a plurality of disks which are rigidly clamped together on a circumference spaced radially from their peripheries and are slightly spaced apart at their peripheries to permit of slight axial yielding under tooth pressure, a supporting member, axially yielding means connecting said disks to said supporting member, and means for limiting the movement of said axially yielding means.

5. A gear wheel comprising a plurality of disks rigidly clamped together at their central portions and also on a circle intermediate between their central portions and their peripheries and slightly spaced apart at their peripheries to permit of axial yielding under tooth pressure, the material of the disks between their central portions and said intermediate circle being thinned to give such portions of the disks axial flexibility, and means for limiting the axial movement of the central portion and radially outer portion of the gear wheel relative to each other.

In witness whereof I have hereunto set my hand this 23rd day of February, 1918.

KARL ALQUIST.